United States Patent [19]

Hamar

[11] Patent Number: 4,468,119
[45] Date of Patent: * Aug. 28, 1984

[54] PENTA-PRISM MODULE HAVING LASER ALIGNMENT ERROR DETECTION AND CORRECTION CAPABILITY

[76] Inventor: Martin R. Hamar, 70 Linden Tree Rd., Wilton, Conn. 06897

[*] Notice: The portion of the term of this patent subsequent to May 10, 2000 has been disclaimed.

[21] Appl. No.: 381,079

[22] Filed: May 24, 1982

[51] Int. Cl.³ ............................. G01B 11/26; G02B 7/18; G01C 9/02
[52] U.S. Cl. .................................... 356/152; 350/6.4; 350/286; 350/287; 356/138; 356/247; 356/248
[58] Field of Search ............... 356/152, 138, 247, 248; 350/6.4, 286, 287

[56] References Cited

U.S. PATENT DOCUMENTS

| | | | |
|---|---|---|---|
| 3,902,810 | 9/1975 | Hamar | 356/138 |
| 4,045,129 | 8/1977 | Hamar | 350/287 |
| 4,297,031 | 10/1981 | Hamar | 350/247 |
| 4,382,680 | 5/1983 | Hamar | 356/247 |

FOREIGN PATENT DOCUMENTS

| | | | |
|---|---|---|---|
| 2260467 | 6/1973 | Fed. Rep. of Germany | 350/287 |
| 1338167 | 11/1973 | United Kingdom | 356/152 |

OTHER PUBLICATIONS

Penta Prism Behavior in Optical Tooling Techniques; Engis Equipment Co., 431 S. Dearborn St., Chicago; 5/11/81.

Primary Examiner—S. C. Buczinski
Attorney, Agent, or Firm—Anthony J. Casella; Gerald E. Hespos

[57] ABSTRACT

An apparatus and method of sweeping a substantially flat optical plane substantially perpendicular to an incident laser beam is disclosed. A penta-prism, optical detector and adjustment means are disposed in a housing adapted to be mounted on a rotatable spindle. When so mounted, the penta-prism is disposed a predetermined distance from the point of intersection of the axis of rotation of the spindle and the axis of a properly oriented laser beam. The optical detector determines whether the axis of the incident laser beam intersects the point of intersection and the adjustment means translates the incident laser beam until its axis substantially intersects the point of intersection in response to the output of the detector means. When this is accomplished, the penta-prism will produce a substantially flat optical plane when the housing is rotated on the spindle.

23 Claims, 3 Drawing Figures

PENTA-PRISM MODULE HAVING LASER ALIGNMENT ERROR DETECTION AND CORRECTION CAPABILITY

BACKGROUND OF THE INVENTION

The present invention is directed to an apparatus and process for deflecting a laser beam through a precise 90° angle using a penta-prism which is rotated to sweep out a flat plane perpendicular to the input laser beam, and more particularly to a technique for easily insuring the proper alignment of the laser beam with the penta-prism assembly.

In U.S. Pat. No. 4,297,031, and in co-pending U.S. Patent Application Ser. No. 313,965, filed Oct. 22, 1981, now U.S. Pat. No. 4,382,680 both by Martin R. Hamar, the entire disclosures of which are hereby incorporated by reference, a technique for sweeping a flat plane perpendicular to an input laser beam is disclosed. As noted therein, a penta-prism is mounted on a spindle and is aligned with an input laser beam. The input laser beam is reflected by the penta-prism to produce an output laser beam at right angles to the input laser beam. As the spindle is rotated, the output laser beam sweeps a plane perpendicular to the input laser beam.

When perfect conditions exists, namely when the axis of rotation of the penta-prism is aligned with the input laser beam, the output beam will sweep a perfectly flat plane. However, if the axis of rotation of the penta-prism is not aligned with the input laser beam, then optical and geometric translation errors in the output beam will occur, as described in more detail in the above-mentioned patent and co-pending patent application. Perfect alignment of the rotation and laser beam axes is very difficult to achieve.

In order to overcome the difficulties in aligning the rotation and laser beam axes while still producing a substantially flat plane perpendicular to the input laser beam, a technique is employed in the above patent and patent application which causes the optical and geometric errors produced by the lack of alignment to cancel each other out. Specifically, the point of intersection of the laser beam with the first reflecting surface of the prism is positioned approximatel a predetermined distance R from the point of intersection of the laser beam and penta-prism rotation axis. When this arrangement is achieved, the geometric and optical translation errors are equal in magnitude but opposite in sign and hence cancel to produce a truly flat plane.

As more fully described in the co-pending patent application, the predetermined distance R is given by $R = D[1.707 - 3.414(1 - 1/N')]$ when a solid penta-prism is employed, and $R = 1.707D$ when a hollow penta-prism is employed, where D is the distance the laser beam traverses within the penta-prism between the first and second reflecting surfaces, and N' is the index of refraction of the penta-prism.

When practicing the above described technique, it is still necessary to relatively position the penta-prism and laser such that the laser beam intersects the penta-prism rotation axis at or near the predetermined point. This is made difficult in some cases due to human error, machinery vibration, air turbulence, acoustic deflection, inter alia.

OBJECT AND SUMMARY OF THE INVENTION

It is therefore an object of the invention to provide a technique for insuring that the laser beam and penta-prism rotation axes intersect at or near the desired point.

It is a further object of the invention to provide a penta-prism module which includes means for insuring that the incident laser beam intersects the penta-prism rotation axis at or near the predetermined point.

It is a further object of the invention to provide a method of insuring that the incident laser beam intersects the penta-prism rotation axis at or near the predetermined point.

It is a further object of the invention to provide an apparatus and process for readily mounting a penta-prism module on a spindle, and for adjusting an incident laser beam relative to the module for producing a truly flat plane perpendicular to the incident laser beam.

In accordance with a first aspect of the invention, apparatus for generating a substantially flat optical plane substantially perpendicular to an incident laser beam from a laser source includes a penta-prism, a detector, and adjustment means. The penta-prism is adapted to be mounted on a spindle approximately a predetermined distance from a predetermined point on the axis of rotation of the spindle. The detector means determines whether the axis of the incident laser beam intersects the predetermined point, and the adjustment means translates the incident laser beam until its axis substantially intersects the predetermined point in response to the output of the detector means, whereby the penta-prism produces the substantially flat optical plane when rotated on the spindle.

Specifically, the detector means may comprise a mirror disposed between the laser source and the penta-prism, and an optical detector having a target point. The optical detector and mirror are each disposed relative to the predetermined point such that a given point on the mirror is substantially of equal distance to the target point and to the predetermined point.

Preferably, the mirror is half-silvered to thereby split the incident laser beam into a first beam directed to the penta-prism and a second beam directed to the optical detector.

A cylindrical lens may optionally be disposed between the mirror and the optical detector.

The adjustment means may include an adjustment lens through which the incident laser beam travels, the orientation of the adjustment lens being adjustable to effect a translation of the incident laser beam. Preferably, the adjustment lens is a plane parallel lens. According to a first embodiment, the adjustment means includes means for manually changing the orientation of the adjustment lens in response to the output of the optical detector. According to a second embodiment, the adjustment means includes an automatic servo device for automatically changing the orientation of the adjustment lens in response to the output of the output of the optical detector.

Alternatively, the adjustment means may include a pair of adjustment lenses through which the incident laser beam travels. The adjustment lenses are adapted to be rotated through mutually perpendicular axes, the orientation of the adjustment lenses being adjustable to effect the translation of the incident laser beam. In this manner, only the penta-prism need be rotated, and the half-silvered mirror, optical detector and adjustment lenses may remain stationary.

According to a second aspect of the invention, apparatus for generating a substantially flat optical plane substantially perpendicular to an incident laser beam from a laser source includes a housing, a penta-prism, an optical detector, a mirror and adjustment means. The housing is adapted to be mounted on a spindle at a predetermined point and rotated thereon. The penta-prism is disposed on the housing approximately a predetermined distance from the predetermined point. The optical detector has a target point and is also disposed on the housing. The mirror is disposed on the housing in front of the penta-prism in the direction of the incident laser beam and functions to direct at least a portion of the incident laser beam to the optical detector. The adjustment means is disposed on the housing in front of the mirror in the direction of the incident laser beam and functions to translate the incident laser beam in response to the output of the optical detector, whereby the penta-prism produces the substantially flat optical plane when the housing is rotated on the spindle.

More specifically, the penta-prism, mirror and optical detector are relatively disposed on the housing such that the optical detector produces an error signal when the axis of the incident laser beam is directed substantially away from the predetermined point. The adjustment means functions to direct the axis of the incident laser beam substantially toward the predetermined point by minimizing the error signal. Fundamentally, a given point on the mirror is substantially of equal distance to the target point and to the predetermined point.

In accordance with a third aspect of the invention, a method for generating a substantially flat optical plane substantially perpendicular to an incident laser beam from a laser source includes mounting a penta-prism on a spindle approximately a predetermined distance from a predetermined point on the axis of rotation of the spindle, detecting whether the axis of the incident laser beam intersects the predetermined point, translating the incident laser beam until its axis intersects the predetermined point if the axis of the incident laser beam does not intersect the predetermined point, and rotating the penta-prism on the spindle to thereby produce the substantially flat optical plane.

The step of detecting may include disposing an optical detector having a target point and a mirror relative to the predetermined point such that a given point on the mirror is substantially of equal distance to the target point and to the predetermined point, the mirror being disposed between the laser source and the penta-prism. The mirror may be half-silvered to thereby split the incident laser beam into a first beam directed to the penta-prism and a second beam directed to the optical detector. The step of detecting may further include the optional step of disposing a cylindrical lens between the mirror and the optical detector.

The step of adjusting may include passing the incident laser beam through an adjustment lens and adjusting the orientation of the adjustment lens to effect the translation of the incident laser beam. Preferably, a plane parallel lens is employed as the adjustment lens. The step of adjusting may further include manually changing the orientation of the adjustment lens depending upon whether the axis of the incident laser beam intersects the predetermined point, or may alternatively include automatically adjusting the orientation of the adjustment lens with an automatic servo device.

According to each of the above aspects of the invention, the predetermined distance is preferably determined by $R = D[1.707 - 3.414(1 - 1/N_\prime)]$ when the penta-prism is solid, and $R = 1.707D$ when the penta-prism is hollow, where D is the distance the laser beam traverses within the penta-prism between the first and second reflecting surfaces thereof, and $N'$ is the index of refraction of the penta-prism.

DETAILED DESCRIPTION OF THE INVENTION

Figure 1:
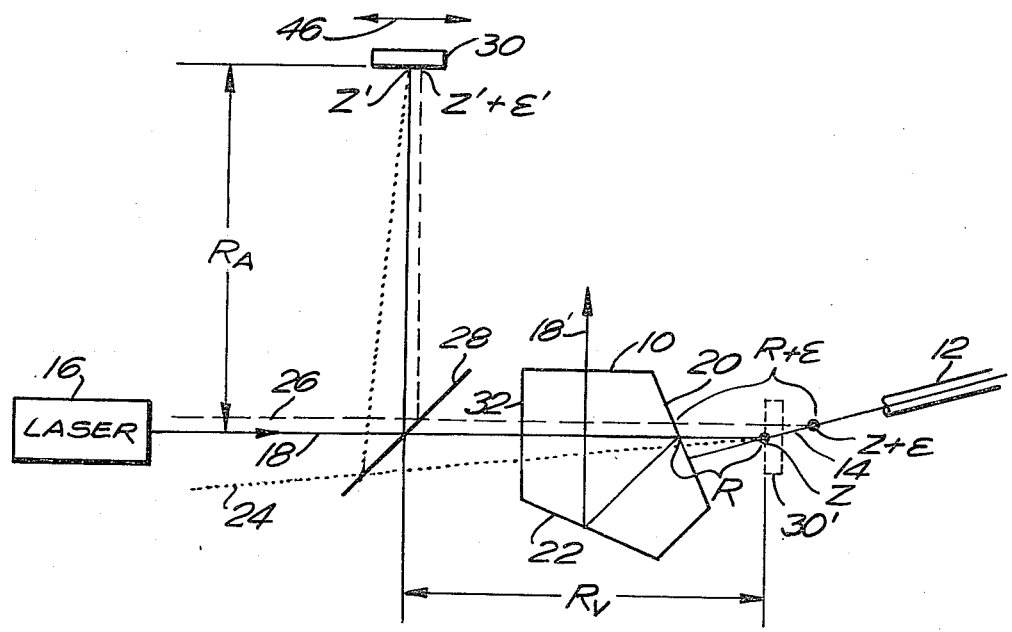
FIG. 1 is a schematic illustration of the apparatus of the subject invention.

The principle employed in practicing the present invention will be explained with reference to FIG. 1. Penta-prism 10 is mounted on spindle 12 and is adapted to rotate on spindle 12 about the axis of rotation 14. Laser 16 provides an incident laser beam 18 which is reflected by first and second reflecting walls 20 and 22 of the penta-prism to provide a reflected laser beam 18' which is disposed at right angles with respect to the incident laser beam 18.

Penta-prism 10 is rotated in order to sweep a flat plane with the reflected laser beam 18'. However, since the axis of rotation 14 is not colinear with laser beam 18, the above-mentioned geometric and optical errors can occur resulting in the production of an unflat or a waffle shaped plane. In accordance with the teachings of the above-mentioned patent and patent application, the distance R between the first reflecting surface 20 to the point of intersection Z between the laser beam and the axis of rotation 14, is chosen such that the optical and geometric errors perfectly cancel, thus producing a truly flat plane upon rotation of penta-prism 10. Given this distance R, a requirement for the system is that the axis of the incident laser beam 18 intersect the axis of rotation at point Z. As shown in FIG. 1 a laser beam such as laser beam 18 or laser beam 24 (illustrated as a dotted line), each of which intersects the axis of rotation 14 at point Z, will provide a reflected laser beam in which the geometric and optical errors are cancelled, reflected laser beam 18' produced by beam 18 being illustrated. Rotation of the penta-prism 10 about axis 14 using either of laser beams 18 or 24 produces a truly flat plane perpendicular to the respective input laser beams 18 or 24.

Problems arise, however, when the axis of the laser beam does not intersect the axis of rotation 14 at or near point Z. This situation can occur despite the careful mounting of the spindle 12 relative to laser 16 due to human error, for example. Also, translational shifts in laser beam 18 from point Z may also occur due to machinery vibration, air turbulence, acoustic deflection and the like.

One example of such a translated beam is illustrated as having an axis 26 (shown in dashed lines) which is translated laterally with respect to laser beam 18 such that it intersects rotation axis 14 at point $Z + \epsilon$ located a distance $R + \epsilon$ from the first reflecting surface 20 of the penta-prism. The use of a laser beam along axis 26 will produce a plane which, while still being perpendicular to the input laser beam, will exhibit geometric and or optical errors, resulting in an unflat plane when the penta-prism is rotated. Unfortunately, the detection of this condition is difficult in a working environment since the tolerances involved are very small, on the order of thousands of an inch.

The laterally translated laser beam axis, such as laser beam axis 26, may be detected through the use of half-silvered mirror 28 and optical detector 30. As shown in the Figure, the half-silvered mirror 28 is disposed at 45° angles relative to the entry face 32 of penta-prism 10 and with respect to optical detector 30. However, as disclosed in co-pending U.S. Patent Application Ser. No. 381,078 filed May 24, 1982. filed concurrently herewith, by Martin R. Hamar, the entire disclosure of which is hereby incorporated by reference, the penta-prism 10, mirror 28 and optical detector 30 may be relatively positioned at substantially any arbitrary angle, the only requirement being that the distances as shown in FIG. 1, namely $R_V$ and $R_A$ be substantially identical. More specifically, the distance $R_V$ taken from any point on the mirror 28 to the desired point Z (the predetermined distance R behind the first reflecting surface 20), must be identical to the distance $R_A$ taken from the same point on the mirror 28 to the center of optical detector 30. By providing mirror 28 and optical detector in this manner, the detector 30 becomes "virtually" located behind penta-prism 10, with its dead center point coincident with point Z, the virtual location of optical detector 30 being shown in phantom at point Z and designated by reference numeral 30'. With the disposition of the mirror 28 and detector 30 in this manner, as more fully described in the above-mentioned co-pending U.S. Patent Application Ser. No. 381,078 filed May 24, 1982, any laser beam having an axis which would intersect the rotation axis 14 at point Z, such as laser beams 18 or 24, would be reflected by half-silvered mirror 28 to the dead center point of optical detector 30, denoted as Point Z' in the Figure, thus providing at the output of optical detector 30 an immediate indication that the laser beam is approximately directed to point Z. On the other hand, if a translation of the laser beam away from point Z occurs, as in the case of laser beam 26, it can be seen that beam 26 will be reflected by mirror 28 to fall at point $Z' + \epsilon'$ on detector 30, thus providing an immediate indication that the laser beam 26 is not properly directed to point Z. It should be noted that only those laser beams which are directed toward point Z, regardless of the angle from which they are directed, will fall on the dead center point Z' of optical detector 30, all other beam paths directed toward some point other than point Z on axis 14 similarly falling at some point other than dead center on optical detector 30.

Figure 2:
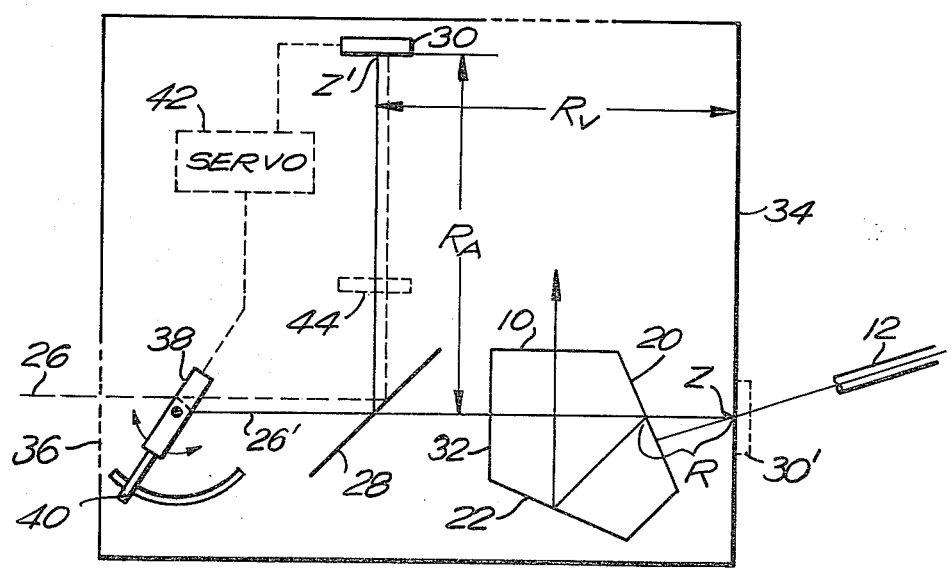
FIG. 2 is a schematic illustration of an alternate embodiment of the apparatus of the subject invention.

The striking advantages of the arrangement illustrated in FIG. 1 will now be discussed with further reference to FIG. 2. A penta-prism module housing 34 is adapted to be attached to spindle 12 at the predetermined point Z, the first reflecting surface 20 of penta-prism 10 being disposed the predetermined distance R therefrom. An incident laser beam, 26, for example, enters the module 34 through window 36 and is delivered to penta-prism 10 by way of a plane parallel glass lens 38 and half-silvered mirror 28. Also provided is optical detector 30, the detector 30, mirror 28 and penta-prism 10 each relatively disposed in the manner discussed with reference to FIG. 1. Also provided is a manual adjustment device 40, or alternatively an automatic servo device 42, either of which function to drive the parallel plane lens 38 to a desired position. Finally, an optional cylindrical lens 44 may be disposed between mirror 28 and optical detector 30, if desired. However, cylindrical lens 44 is not required for proper operation.

In operation, the module 34 is mounted on the spindle 12 at point Z, the distance R being pre-set for the particular penta-prism to be employed. Thus, the incident laser beam axis need only be directed at point Z, as shown, in order to generate a truly flat plane upon rotation of the spindle 12. An incident laser beam 26 is directed into the module in the approximate direction of point Z and passes through plane parallel lens 38 to half-silvered mirror 28. A portion of the beam is reflected from mirror 28 to optical detector 30, and in the event that the incident beam is not exactly directed to point Z, the beam which is reflected to optical detector 30 will fall on a point other than the dead center point Z', thus producing an output from optical detector indicative of the translational error in beam 26. This error signal from detector 30 may be applied to a meter or other visual indication such that an operator can manually move plane parallel lens 38 by way of manual adjustment means 40 until the output of detector 30 is zeroed, indicating that beam 26 has been translated to beam 26', for example, which is directed exactly at point Z. Alternatively, the error signal from detector 30 may be delivered to an automatic servo device 42 which functions to adjust the rotation of lens 38 such that the error signal is driven to zero. Cylindrical lens 44 may be provided since detector 30 need only determine the position of the beam reflected from mirror 28 along a single dimension as illustrated by arrow 46, since a translation of the beam 26 perpendicular to direction 46 (perpendicular to the plane of the figure) will effect a translation of the reflected beam 18' within the generated plane.

Figure 3:
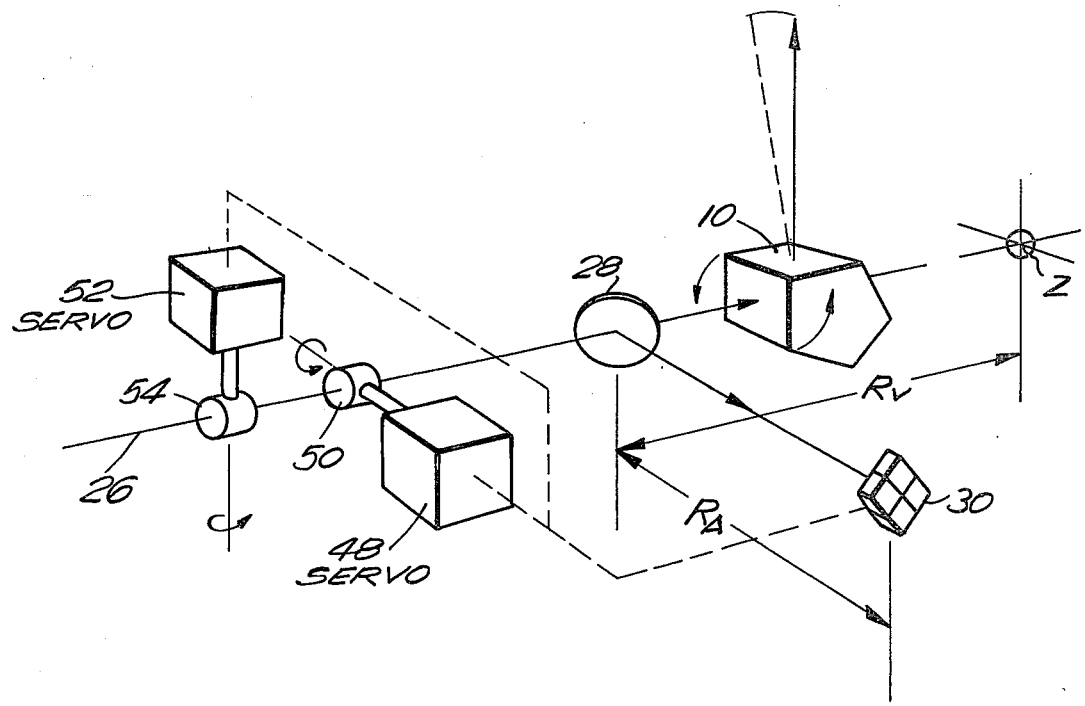
FIG. 3 is a schematic illustration of a third embodiment of the apparatus of the subject invention.

An alternative embodiment of the invention will now be described with reference to FIG. 3. The FIG. 3 embodiment comprises a penta-prism 10, beam splitter 28, detector 30, a vertical servo 48 which rotates a first plane parallel glass lens 50 through a horizontal axis, and a horizontal servo 52 which rotates a second plane parallel glass lens through a vertical axis. By employing the pair of orthogonal servos 48 and 50 along with the corresponding plane parallel lenses 50 and 54, only the penta-prism 10 need be rotated, and the beam splitter 28, detector 30, vertical and horizontal servos 48 and 50, and plane parallel lenses 50 and 54 may remain stationary, thereby reducing the size of the module if so desired. The detector 30 functions to provide both horizontal and vertical alignment information in a well known manner, the horizontal and vertical deviations of the input laser beam 26 from the dead center point of detector 30 being applied to the horizontal and vertical servos 52 and 48, respectively, to thereby drive the input laser beam both vertically and horizontally toward the desired point Z.

Thus, the module in accordance with the present invention provides a virtually fool-proof technique for sweeping a truly flat plane perpendicular to an incident laser beam. The module need only be attached to the spindle at a predetermined coupling point, and a laser beam, which need only be roughly directed toward the penta-prism, is required. The plane parallel lens 38 may be manually or automatically rotated such that the laser beam passing therethrough attains the desired orientation to produce a substantially perfect optical plane.

Although the present invention has been described with reference to the foregoing specification and drawings, the scope of the invention will now be defined with reference to the following claims.

I claim:

1. Apparatus for generating a substantially flat optical plane substantially perpendicular to an incident laser beam from a laser source comprising:
    a penta-prism adapted to be mounted on a spindle approximately a predetermined distance from a predetermined point on the axis of rotation of said spindle;
    detector means disposed between said laser source and said penta-prism and operative for determining whether the axis of said incident laser beam intersects said predetermined point; and
    adjustment means for translating said incident laser beam until its axis substantially intersects said predetermined point in response to the output of said detector means, whereby said penta-prism produces said substantially flat optical plane when rotated on said spindle.

2. The apparatus of claim 1 wherein said detector means comprises a mirror disposed between said laser source and said penta-prism, and an optical detector having a target point, said optical detector and mirror each disposed relative to said predetermined point such that a given point on said mirror is substantially of equal distance to said target point and to said predetermined point.

3. The apparatus of claim 2 wherein said mirror is half-silvered to thereby split said incident laser beam into a first beam directed to said penta-prism and a second beam directed to said optical detector.

4. The apparatus of claim 3 further including a cylindrical lens disposed between said mirror and said optical detector.

5. The apparatus of any one of claims 1-4 wherein said adjustment means comprises an adjustment lens through which said incident laser beam travels, the orientation of said adjustment lens being adjustable to effect said translation of said incident laser beam.

6. The apparatus of claim 5 wherein said adjustment lens is a plane parallel lens.

7. The apparatus of claim 6 wherein said adjustment means further includes means for manually changing the orientation of said adjustment lens in response to said output of said optical detector.

8. The apparatus of claim 6 wherein said adjustment means further includes automatic servo means for automatically changing the orientation of said adjustment lens in response to said output of said optical detector.

9. The apparatus of any one of claims 1-3 wherein said adjustment means comprises first and second adjustment lenses through which said incident laser beam travels, the orientation of said first and second adjustment lenses being adjustable to effect a translation of said incident laser beam.

10. The apparatus of claim 9 wherein said first and second adjustment lenses are plane parallel lenses, and said first adjustment lens is rotatable about a first axis in response to a first output of said optical detector, and said second adjustment lens is rotatable about a second axis perpendicular to said first axis in response to a second output of said optical detector.

11. Apparatus for generating a substantially flat optical plane substantially perpendicular to an incident laser beam from a laser source, said apparatus comprising:
    a housing adapted to be mounted on a spindle substantially at a predetermined point and rotated thereon;
    a penta-prism disposed on said housing approximately a predetermined distance from said predetermined point;
    an optical detector having a target point and disposed on said housing;
    a mirror disposed on said housing in front of said penta-prism in the direction of said incident laser beam and functioning to direct at least a portion of said incident laser beam to said optical detector; and
    adjustment means disposed on said housing in front of said mirror in the direction of said incident laser beam for translating said incident laser beam in response to the output of said optical detector, whereby said penta-prism produces said substantially flat optical plane when said housing is rotated on said spindle.

12. The apparatus of claim 11 wherein said penta-prism, said mirror and said optical detector are relatively disposed on said housing such that said optical detector produces an error signal when the axis of said incident laser beam is directed substantially away from said predetermined point, said adjustment means functioning to direct said axis of said incident laser beam substantially toward said predetermined point by minimizing said error signal.

13. The apparatus of claim 12 wherein a given point on said mirror is substantially of equal distance to said target point and to said predetermined point.

14. The apparatus of any one of claims 1-4 or 11-13 wherein said predetermined distance is approximately given by $R = D[1.707 - 3.414(1 - 1/N,)]$, when said penta-prism is solid, and $R = 1.707D$, when said penta-prism is hollow, where D is the distance the laser beam traverses within the penta-prism between the first and second reflecting surfaces thereof, and N' is the index of refraction of the penta-prism.

15. A method for generating a substantially flat optical plane substantially perpendicular to an incident laser beam from a laser source, the method comprising:
    mounting a penta-prism on a spindle approximately a predetermined distance from a predetermined point on the axis of rotation of said spindle;
    providing a detector means disposed between said laser source and said penta-prism and operative for determining whether the axis of said incident laser beam intersects said predetermined point;
    detecting with said detector means whether the axis of the incident laser beam intersects said predetermined point;
    translating said incident laser beam until its axis substantially intersects said predetermined point if said axis of said incident laser beam does not intersect said predetermined point; and
    rotating said penta-prism on said spindle to produce said substantially flat optical plane.

16. The method of claim 15 wherein said step of detecting includes disposing an optical detector having a target point and a mirror relative to said predetermined point such that a given point on said mirror is substantially of equal distance to said target point and to said predetermined point, said mirror being disposed between said laser source and said penta-prism.

17. The method of claim 16 wherein said step of detecting further includes splitting said incident laser beam into a first beam directed to said penta-prism and a second beam directed to said optical detector, through the use of a half-silvered mirror.

18. The method of claim 17 further including disposing a cylindrical lens between said mirror and said optical detector.

19. The method of any one of claims 15–18 wherein said step of translating includes passing said incident laser beam through an adjustment lens, and orientating said adjustment lens to effect said translation of said incident beam.

20. The method of claim 19 wherein said step of translating includes the use of a plane parallel lens.

21. The method of claim 20 wherein said step of translating further includes manually changing the orientation of said adjustment lens depending upon whether the axis of said incident laser beam intersects said predetermined point.

22. The method of claim 20 wherein said step of translating further includes automatically changing the orientation of said adjustment lens through the use of an automatic servo device depending upon whether the axis of said incident laser beam intersects said predetermined point.

23. The method of any one of claims 15–18 wherein said predetermined distance is approximately given by $R = D[1.707 - 3.414(1 - 1/N,)]$, when said penta-prism is solid, and $R = 1.707D$, when said penta-prism is hollow, where D is the distance the laser beam traverses within the penta-prism between the first and second reflecting surfaces thereof, and N' is the index of refraction of the penta-prism.

* * * * *